3,353,991
CRYSTALLINE POLYPROPYLENE COATED WITH A VINYLIDENE CHLORIDE COPOLYMER
William D. Shelburg, Bay City, and Robert F. Hettler, Midland, Mich., assignors to The Dow Chemical Company, Midland, Mich., a corporation of Delaware
No Drawing. Filed Mar. 2, 1964, Ser. No. 348,798
1 Claim. (Cl. 117—138.8)

ABSTRACT OF THE DISCLOSURE

This invention relates to crystalline polypropylene film having a self-anchoring, heat-sealable, moisture-resistant coating comprising a substantially homogeneous copolymer of
  (a) From 80 to 85 weight percent vinylidene chloride,
  (b) From 9 to 14 weight percent acrylonitrile,
  (c) From 4 to 6 weight percent methyl methacrylate, and
  (d) About 0.5 weight percent of an unsaturated aliphatic acid selected from the group consisting of acrylic acid, methacrylic acid, and itaconic acid, the proportions being selected to total 100 percent.

---

Films and other shaped and molded articles of polyolefins have many attractive characteristics including excellent resistance to embrittlement, particularly at low temperatures. In many of its uses, however, it is desirable to coat the polymer, or articles made therefrom, with a vinylidene chloride polymer, and more particularly a normally crystalline vinylidene chloride polymer, to provide an effective barrier against the transmission or permeation of gases or vapors. Further, it has been found desirable to form composite structures, i.e. packaging materials, from two or more polyolefin films wherein a protective coating of a vinylidene chloride polymer is first applied to at least one surface of each film and the films then secured together by forming a heat seal between contacting surfaces of such protective coatings.

In the past, attempts to apply vinylidene chloride interpolymer coatings by means of lacquer systems to shaped articles fabricated from non-aromatic hydrocarbon polyolefins have been noticeably unsuccessful. This is because polyolefin films and other articles, as is well known, commonly have a smooth, relatively slippery and wax-like surface which is poorly adapted to provide for suitable adhesion of applied materials by mere physical attachment. Furthermore, the relatively inert chemical nature of such polyolefins resists the efficient attachment of most materials by chemical linkage or bonding even though the surfaces of such polyolefins may have first been subjected to the action of oxidizing agents, flame-treatment and/or corona discharge. In addition, composite structures formed from two or more polyolefin films wherein a protective coating of a vinylidene chloride polymer is first applied to at least one surface of each film and the films are then joined together by forming a heat seal between contacting surfaces of such protective coating, have required undesirably high temperatures, i.e. temperatures up to about 140° C. to effectively heat seal the contacting layers of vinylidene chloride polymer, with accompanying deleterious effects upon the polyolefin film. Still further, prior known vinylidene chloride polymers which are used to coat polyolefins generally require solvent mixtures containing aromatic solvents such as toluene and the like which are also strong solvents for the polyolefin. Subsequently, attempts to apply such prior known vinylidene chloride polymer coating compositions have often resulted in a severe solvent attack on the polyolefin substrate, frequently causing crazing, warping, solution, or general distortion of the desirable surface properties of the substrate.

Accordingly, it is an object of this invention to provide a lacquer composition suitable for the coating of shaped objects prepared from non-aromatic hydrocarbon polyolefins.

It is a further object to provide a method of coating shaped objects prepared from non-aromatic hydrocarbon polyolefins.

It is a still further object to provide composite articles comprising one or more non-aromatic hydrocarbon polyolefin films coated with a continuous, durable, moisture resistant and adherent vinylidene chloride interpolymer, which interpolymer is heat sealable at temperatures which do not adversely affect the polyolefin substrate.

It has been found that the vinylidene chloride interpolymer coating compositions, as defined herein, are particularly adapted for forming continuous, durable, moisture resistant and adherent coatings to non-aromatic hydrocarbon polyolefins such as the polymers and copolymers of ethylene, propylene, butylene and the like and their halogenated derivatives, and are especially suited for forming such protective coatings on polypropylene of predominantly crystalline structure.

Still further it has been found that the vinylidene chloride interpolymer coating as defined herein may be effectively and efficiently heat sealed at temperatures between about 100 and 120° C. thereby significantly minimizing the adverse effects of heat upon the polyolefin substrate being coated.

Composite articles which may be obtained by practice of the present invention possess to an unusual degree many of the desirable and beneficial properties of both the polyolefin and vinylidene chloride interpolymer resins. They are strong, tough and tear resistant and remain strong and flexible at relatively low temperatures. Further, such composite structures are extremely impermeable to gases and vapors, especially to oxygen, and are further characterized by excellent clarity. The composite articles are also possessed of a strong and effective bond between the applied coating of vinylidene chloride interpolymer and the polyolefin article. Further, opposed surfaces of the applied coatings may be easily heat sealed to form uniformly adherent film structures, utilizing temperatures which do not adversely affect the polyolefin substrates.

Further, the composite film structures prepared in accordance with the present invention have particular utility as wrapping and packaging material for foodstuffs and other articles which are intended to be handled or maintained and stored at relatively low temperature in a refrigerated or frozen condition. Such structures effectively prevent the dehydration of the packaged articles and avoid development of the condition known as "freezer burn" which frequently occurs in inadequately protected frozen foods. Other composite structures including tubes, flexible bottles and other containers such as cartons and boxes may also be made by practice of the invention.

Advantageously, relatively thin polyolefin films, such as those films prepared from the polymers and copolymers of ethylene, propylene and butylene and the like, and their halogenated derivatives are employed in order to obtain preferred composite film structures according to the invention. Beneficial results, for example, are readily obtainable from films having a thickness which is not greatly in excess of about 20 mils. It is frequently even more beneficial to employ polyolefin films that have a thickness between about 0.25 and 5.0 mils.

Polypropylene films and other articles which are effectively coated according to the process of this invention are generally predominantly crystalline, as distinguished from amorphous structures. In this regard, any polypropylene whose crystalline content is such that the polymer has a melting point (the temperature at which loss of crystallinity occurs as evidenced by a disappearance of birefringence) of at least about 160° C. if preferably used. Polypropylene of this description can be prepared by any of several methods as, for example, by the processes of Belgian Patents 546,856 and 538,782.

The vinylidene chloride interpolymers employed in the practice of the invention are polymeric materials which may be prepared by any of the well-known methods such as emulsion polymerization utilizing a continuous, or continual addition of monomer mixture at a predetermined rate. It is to be pointed out, however, that the interpolymer composition range as defined herein does not necessarily refer to the composition of the monomer mixture employed in the preparation of the interpolymer but refers only to the composition of the interpolymeric material. Thus, such interpolymers are substantially homogeneous polymeric materials wherein the polymer molecules have the required amounts of the indicated monomeric ingredients substantially uniformly interpolymerized therein. Homogeneous polymers and interpolymers generally are well known in the art. It is further pointed out that only the interpolymers of the prescribed composition may be used for obtainment of required solubility and heat seal characteristics as well as desired barrier properties.

As previously mentioned, the solvents employed in the practice of the present invention include methyl ethyl ketone, methyl isobutyl ketone, acetone, ethyl acetate and butyl acetate, and tetrahydrofuran, as the preferred materials. It has been found that such solvents, in addition to being commercially and industrially economical to use, effectively solubilize the herein defined vinylidene chloride interpolymers and do not deleteriously affect the surface of the polyolefin to be coated. It is to be emphasized, however, that the preferred solvents as described herein, do not represent the only materials which may be employed for the purposes of the invention. Thus, any solvent or mixture of solvents which is capable of effectively solubilizing the herein defined vinylidene chloride interpolymer constituent of the coating composition, and which does not excessively soften or otherwise adversely affect the polyolefin substrate to be coated, may be used. Exemplary of such additional solvents are: chlorinated hydrocarbons such as tri- and tetrachloroethylene, cyclic aliphatic ketones such as cyclohexanone, and substituted aliphatic hydrocarbons such as 2-nitropropane, and mixtures thereof, among many others. Prior known lacquer coating compositions utilizing aromatic solvents such as toluene and the like have been found generally undesirable for coating polyolefin surfaces, particularly polypropylene of predominantly crystalline structure, due to the solvating or softening action of such solvents upon the surface of the polyolefin substrate.

The coating compositions as described herein are readily prepared by dissolving the solid vinylidene chloride interpolymer in the solvent or solvent mixture by any of the conventional means such as agitating a suspension of the polymer in the solvent at room temperature, or by heating in combination with agitation and the like. Advantageously, in cases where time is not a significant factor, the solvent and interpolymer are placed in the same vessel and allowed to stand until complete solution has taken place.

The concentration of the interpolymer in the solvent medium will vary with the particular coating method employed, the coating weight desired and the characteristics of the specific interpolymer utilized. Desirably the interpolymer will comprise about 10 to 20 percent by weight of the total lacquer mixture although higher or lower concentrations are utilized if advantageous.

The lacquers comprising the vinylidene chloride interpolymer and suitable solvent are readily applied to shaped articles by conventional means such as spraying, brushing, dipping, rolling and the like. Generally, it is advantageous to apply a lacquer having a temperature of about from 20 to 40° C.

Usually, it is advantageous and beneficial to apply to the substrate polyolefin, particularly that employed for most wrapping and packaging purposes, a coating of the interpolymer composition about 0.1 mil in thickness in order to obtain adequate barrier properties. Frequently, lesser amounts are quite satisfactory for some applications where maximum barrier properties are not required. Beneficially, when maximum protection of the contents of such packaging is desired, coating thicknesses in excess of 0.1 mil are readily utilized. These may be applied by depositing a relatively heavy coat of the coating lacquer comprising the solvent and interpolymer and subsequently drying, or the coating may be applied by means of successive thinner coats of a lacquer. When applied to the polyolefin or other substrate, generally it is advantageous to remove the solvent by heating the substrate and coating to a temperature in excess of the boiling point of the solvent. However, lacquers in accordance with the present invention applied to polyolefins may be permitted to dry at room temperature or even lower and provide an excellent coating. The drying temperature is primarily a factor of cost, inventory, and operating convenience.

Although the present invention is directed primarily to coating of shaped objects prepared from non-aromatic hydrocarbon polyolefins and to composite articles prepared thereby, it is pointed out that the lacquer compositions of the present invention may also be advantageously used to coat substrates such as: paper of the coated and uncoated variety and particularly paper having a polyolefin coating, as well as paper prepared from fibers other than wood cellulose; metal foils such as those obtained from aluminum and gold foil; treated and untreated nylon; thermoplastic polymers and copolymers of vinyl chloride including homopolymeric vinyl chloride; and thermoplastic polymers and interpolymers of vinylidene chloride with one or more monomers such as vinyl chloride and ethyl acrylate among many other ethylenically unsaturated copolymerizable materials.

The following examples wherein all parts and percentages are to be taken by weight illustrate the present invention but are not to be construed as limiting its scope.

EXAMPLE (A) *Preparation of vinylidene chloride interpolymers*

In each of a series of experiments, there was charged into a glass lined polymerization vessel a mixture of 99 grams of water, 0.73 gram of the dihexylester of sodium sulfosuccinic acid, 0.16 gram of the sodium salt of 2-ethylhexyl sulfate, 0.57 gram of potassium persulfate and 0.41 gram of itaconic acid. To this aqueous phase was subsequently added 6 grams of an initial monomer charge composed of from 80 to 85 percent vinylidene chloride, from 4 to 6 percent methyl methacrylate, and from 9 to 14 percent acrylonitrile. Each reaction mixture was then individually stirred at a temperature of about 55° C. until a pressure drop within the reactor of about 2 pounds from the maximum was observed. Thereafter, a total of 75 additional grams of the monomer mixture was then separately added at a rate of about 8 grams per hour. The reactions were each then allowed to continue until the pressure within the polymerization reactor had dropped about 50 percent from maximum. The reactions were each then vented and the resulting individual interpolymer latices coagulated by addition of 1 part of latex to 2 parts of a 0.4 percent aqueous solution of alum. Each of the so-formed interpolymers was then separated, filtered and dried.

(B) *Preparation of lacquer compositions and testing of coated polypropylene substrates*

Each of the interpolymers was then separately dissolved in methyl ethyl ketone in amounts sufficient to form individual lacquer compositions containing about 15 percent of interpolymer solids. Each lacquer was then separately coated on corona discharge treated surfaces of individual sheets of 50 gauge, oriented polypropylene film having a length of about 12 inches and a width of about 8 inches, using a No. 20 stainless steel wire-wound casting rod. The individual coated test samples were then each air dried at a temperature of about 200° F. for about 2 minutes until essentially all of the methyl ethyl ketone had volatilized.

Thereafter individual 6" x 6" samples of each of the coated polypropylene sheets were prepared and separately folded lengthwise to bring the coated surface thereof into contact. Each of the folded film structures was then separately placed between conventional heat seal bars and sealed at temperatures ranging from 100° C. to 140° C. utilizing a pressure of 22 p.s.i. and a dwell time of about 0.5 second.

The average heat seal strength of each test sample was then determined by preparing 5 individual strips having a width of about 1 inch, from each heat sealed sample, separating the ends of each strip, placing the free ends in an Instron tensile tester and pulling them apart. The heat seal strength is the average force in grams required to rupture the coating and the heat seal adhesion is the average force required to peel the coating from the polypropylene substrate.

Oxygen transmission data were also obtained for each test sample as cubic centimeters at standard temperature and pressure/100 in.²/24 hours/atmosphere driving force.

For purposes of comparison, a series of test samples essentially identical to those described herein were prepared by the procedure described above utilizing as the vinylidene chloride interpolymer a copolymer consisting essentially of 80 weight percent vinylidene chloride and, complementarily, 20 weight percent acrylonitrile.

In yet another comparison, a series of test samples essentially identical to those described herein were prepared by the procedure described above utilizing a terpolymer of 80 weight percent vinylidene chloride, 20 weight percent acrylonitrile and 0.5 weight percent itaconic acid.

The following Table 1 illustrates the heat seal temperatures used, thet oxygen transmission rate of the coated polypropylene test samples and the average heat seal strength and adhesion in grams per inch of sample width for each of the test samples.

The data below illustrate the significant improvement obtained in both reduction of oxygen transmission rate

TABLE 1.—PHYSICAL PROPERTIES OF COATED ORIENTED POLYPROPYLENE FILM

| Interpolymer Coating Composition, VeCl₂/VCN/ Methyl Methacrylate/ Itaconic Acid | Oxygen Trans. Rate | Heat Seal Strength/Heat Seal Adhesion (grams/ inch of sample width) | | | |
|---|---|---|---|---|---|
| | | 110° C. | 120° C. | 130° C. | 140° C. |
| For Comparison: | | | | | |
| 80/20/-/- | 0.62 | 64/55 | 126/93 | 177/139 | 415/215 |
| 80/20/-/0.5 | | 86/72 | 119/94 | 366/338 | |
| This Invention: | | | | | |
| 80/14/6/0.5 | 0.58 | 155/115 | 245/185 | 415/215 | 355/205 |
| 83/13/4/0.5 | 0.48 | 165/135 | 315/230 | 410/205 | 435/220 |
| 84/11/5/0.5 | 0.45 | 225/175 | 325/190 | 385/200 | 370/205 |
| 85/9/6/0.5 | 0.43 | 190/150 | 360/210 | 390/>220 | 430/220 | and in heat seal strength and adhesion as provided by the lacquer compositions of the present invention. Such improvement is particularly significant when utilizing heat seal temperatures in the range of from about 110 to 120° C., wherein the deleterious effects of heat upon the polyolefin substrate being coated is greatly reduced. Further, it has been found that neither the clarity nor the tensile strength or elongations of the test samples prepared using the lacquer compositions of the present invention were adversely affected.

Similar good results were also obtained wherein the itaconic acid was replaced with acrylic acid or methacrylic acid in amounts sufficient to provide equivalent molar concentrations of the carboxyl group and wherein such acids were added to the aqueous phase in admixture with the monomer charge.

Equally good results are obtained wherein the methyl methacrylate ingredient of the monomeric mixture is replaced individually by ethyl methacrylate, butyl methacrylate and butyl ethacrylate.

Similar good results are also obtained wherein the interpolymers of the present invention are solubilized in methyl isobutyl ketone, ethyl acetate, butyl acetate, and tetrahydrofuran or mixtures thereof with acetone prior to being coated on the polypropylene substrate.

What is claimed is:

A coated product comprising a polypropylene film of predominantly crystalline structure having a self-anchoring coating comprising a substantially homogeneous copolymer of:
(a) from 80 to 85 weight percent vinylidene chloride,
(b) from 9 to 14 weight percent acrylonitrile,
(c) from 4 to 6 weight percent methyl methacrylate, and
(d) about 0.5 weight percent of an unsaturated aliphatic acid selected from the group consisting of acrylic acid, methacrylic acid and itaconic acid, the proportions being selected to total 100 percent.

References Cited

UNITED STATES PATENTS

| 2,762,720 | 9/1956 | Michel | 117—161 X |
| 2,805,963 | 9/1957 | Gaylord | 117—161 X |
| 2,829,069 | 4/1958 | Michel | 117—138.8 X |
| 2,923,964 | 2/1960 | Plonsky | 117—138.8 X |
| 3,041,208 | 6/1962 | Hay et al. | 117—161 X |
| 3,108,017 | 10/1963 | Messwarb et al. | 117—138.8 |
| 3,240,742 | 3/1966 | Hahn et al. | 117—161 X |
| 3,255,034 | 6/1966 | Covington et al | 117—47 |

FOREIGN PATENTS

| 654,342 | 6/1951 | Great Britain. |
| 889,564 | 2/1962 | Great Britain. |

WILLIAM D. MARTIN, *Primary Examiner.*

M. LUSIGNAN, *Assistant Examiner.*